Dec. 28, 1965 C. H. BEIDERBECKE ET AL 3,225,887

DOCUMENT FEEDING DEVICE

Filed June 17, 1963 3 Sheets-Sheet 1

INVENTORS.
CHARLES H. BEIDERBECKE
MARSDEN B. EMIG

BY D. Kendall Cooper

ATTORNEY.

Dec. 28, 1965 C. H. BEIDERBECKE ET AL 3,225,887

DOCUMENT FEEDING DEVICE

Filed June 17, 1963 3 Sheets-Sheet 2

United States Patent Office 3,225,887
Patented Dec. 28, 1965

3,225,887
DOCUMENT FEEDING DEVICE

Charles H. Beiderbecke and Marsden B. Emig, Lexington, Ky., assignors to International Business Machines Corporation, New York, N.Y., a corporation of New York Filed June 17, 1963, Ser. No. 288,294
12 Claims. (Cl. 197—130)

This invention relates to document feeding devices and more particularly to a device of this type which is associated with an office machine or similar apparatus.

A document feeding device as disclosed herein has particular utility in the preparation of documents with one or more lines of information. Documents prepared according to the invention are printed in a rapid and efficient manner and with a high degree of line spacing accuracy.

In recent years a number of photographic machines have been developed for the purpose of composing lists, columns, paragraphs or pages of information from individual source documents, each of which may have only one or several lines of information. These machines are used in the preparation of publications such as telephone books, catalogues, directories, indexes, price books, and parts books. Publications of this nature usually contain many items of information, sometimes running into the hundreds of thousands. According to one popular method of composing publications of this kind, each individual item of information is first typed on a separate document such as a file card or business machine card. An entire related group of cards is maintained together. Since each item of information is printed on a separate card, alteration of the information including changes, additions, or omissions can be very simply effected by removal of the card involved and replacement with a different card having updated information, or a number of cards, as required.

In order to compose an entire page from the cards, an entire group of cards is placed in position into a photolisting machine for the preparation of master photographic negatives, each of which includes the information contained on many cards. After being positioned, the cards are subsequently aligned, and fed one by one through the machine with extreme accuracy. As each card is moved into position for photographing, a particular master negative being produced is displaced one or more lines in order to photograph the information from each card in succession.

In this manner, individual master negatives are prepared which might, for example, have a plurality of lines such as a hundred or more, each line having been derived from a single original file card. Machines of the general type provided for photolisting purposes invariably have registering mechanisms which insure extreme accuracy of column alignment and line spacing on the finished negative even though the machine may operate at a very high speed.

Because of the high accuracy required in the photolisting process, it is essential that the original source documents also be prepared with high accuracy. Each line of printed information on a source document should appear in a particular predetermined accurately positioned location on the card involved. If this is not the case, the advantages of accurate registration in the photolisting machine will be minimized or lost entirely.

A number of printing or typewriting devices have existed in the prior art for the preparation of documents or cards with the extreme accuracy required for an application of this type. Some of the prior art devices have had locating pins onto which the cards have been located during their preparation. However, many times an operator who is working in a rapid manner might insert the source document on the pins in such a manner that the pin holes in the document are damaged or completely ruined. This results in subsequent inaccurate location of the document, or other feeding and handling problems. In certain other devices, each original card has been inserted in the printing device against a locating blade which is provided ostensibly for the purpose of insuring accurate registration during printing. However, on occasion an individual card may be positioned accurately against the blade initially, but as feeding of the card proceeds, various frictions established between the card and the feed rolls, or other parts, will tend to pull the card away from the locating stop, thereby resulting in a loss of the accuracy that was previously established.

In addition, prior devices of this type have usually required the manual insertion of each individual card into the device for printing purposes. This has required that registration of each card be accomplished on an individual basis. Since the insertion operation is manual in nature, extreme accuracy of placement of the card has been unlikely, and in fact usually not possible, during the document printing operation. Also, considerable variation in accuracy might exist from one document to another.

Accordingly, an object of the invention is to provide a device for handling documents with great accuracy.

Another object of the invention is to provide a device to be used in association with an office machine for the preparation of printed documents in an accurate manner.

A further object of the invention is to provide a document feeding device for a typewriter for accurately feeding a plurality of documents in succession.

An additional object of the invention is to provide in association with a typewriter, a document feeding device which requires a minimum of control and intervention on the part of the operator.

An additional object of the invention is to provide a document feeding device that is based on simplified aligning, feeding, and ejecting principles.

A still further object of the invention is to provide in association with a typewriting machine, a document feeding device which requires a minimum of operating procedures in addition to those normally required during the course of operation of the typewriting machine.

In order to accomplish these and other objects of the invention, there has been provided for use in conjunction with a printing apparatus, such as a typewriter, a document feeding device which is operative during a portion of a cycle to feed a document during manual operation of the typewriter platen, as well as during subsequent line spacing operations, and which is automatically operable during another portion of the same cycle to be restored in order to feed a subsequent document.

The foregoing and other objects, features, and advantages of the invention will be apparent from the following more particular description of the preferred embodiment of the invention as illustrated in the accompanying drawings. In the drawings.

Figures 1, 2, 4:
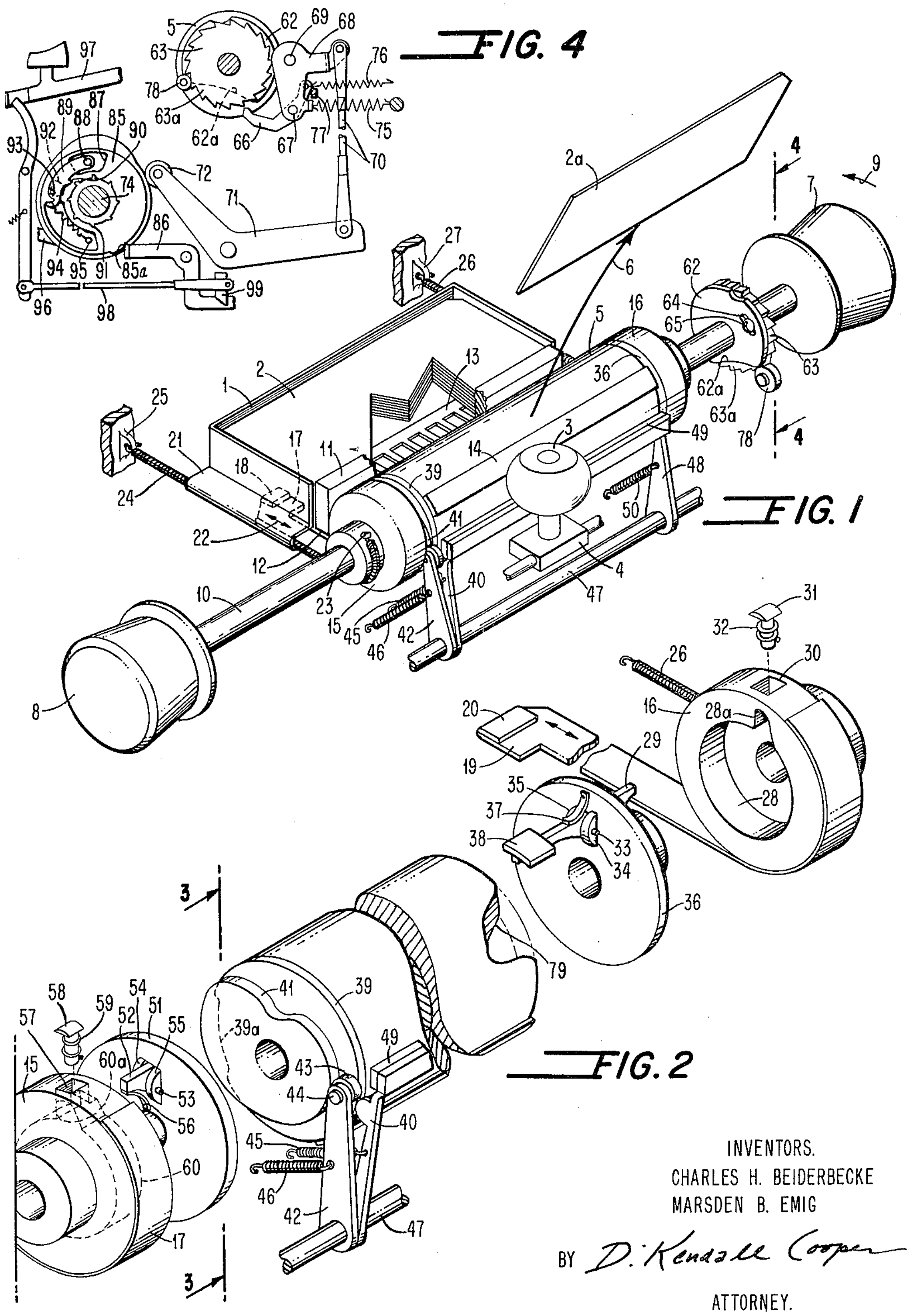
FIG. 1 represents a document handling and typewriting device in which the invention is incorporated.
FIG. 2 represents an exploded view of portions of the device of FIG. 1.

FIGS. 3*a*, 3*b*, 3*c*, 3*d*, 3*e* and 3*f* are side elevations along the line 3—3 in FIG. 2 which illustrate relative positions of various elements in the device of FIGS. 1 and 2 during a typical operating cycle.

FIG. 4 is a side elevational view along the line 4—4 in FIG. 1 which shows mechanism for effecting a stepped feeding of a document.

The device of FIG. 1 includes a hopper 1 which accommodates a plurality of individual documents or cards 2. In the embodiment shown, hopper 1 is associated with a typewriting machine such as that disclosed in U.S. Patent 2,919,002—L. E. Palmer. The Palmer typewriter has a single element type head, such as type head 3, which is mounted on a carrier 4 that moves longitudinally adjacent a platen 5. The type head 3 is provided with characters that are arranged in rows and columns. Various selecting links or latches are controlled by keylevers in the machine in different combinations for rotating and tilting type head 3 in order to present a desired character in proper typing position. The selecting mechanism is not shown in FIG. 1, but is fully disclosed in the aforementioned Palmer patent.

The underlying purpose of the device of FIG. 1 is to feed, align, retain and position each one of the cards 2 around the platen 5 in order to print one or more lines of information thereon. Ordinarily, anywhere from 1 to 3 or 4 lines would be printed on a single card 2, depending on the requirements of the job in process.

Following the printing operation, each individual card, such as card 2*a*, is subsequently ejected from the device in a direction generally indicated by the arrow 6. After its ejection, card 2*a* can then be inserted in its proper place in a group of similar cards for subsequent use during the photolisting operation previously described.

Initially, the operator of the machine would place a group of cards, such as cards 2, in the hopper 1. The feeding, aligning, and positioning of each card is then performed in a simple and effective manner by manual rotation of a right platen knob 7 or a left platen knob 8 in a direction indicated by the arrow 9. The platen 5 is mounted on a platen drive shaft 10 in a substantially free running manner, but is rotated in a manner to be described when either one or both of the knobs 7 or 8 is rotated.

Hopper 1 has a throat guide 11 which is positioned in such a manner that an opening 12 large enough for passage of one card only is established at the bottom edge of the stack of cards 2. The stack of cards 2 is supported in part by a flat spring 13 which also serves to guide the bottom card of the stack as each card is fed into position through the opening 12. As each card is fed from the bottom of the stack in hopper 1, it initially encounters a positioning blade 14 which is mounted on platen 5. The positioning blade 14 serves to align each card, and also serves to retain the leading edge of each card as it proceeds around the platen during the feeding and printing operation.

Integrally associated with the platen 5 is a left feed knife drive disc 15 and a right feed knife drive disc 16. Discs 15 and 16 are shown in somewhat greater detail in FIG. 2. Attached circumferentially about the disc 15 is a feed knife strap 17 which has a feed knife portion 18. Portion 18 protrudes slightly above the surface of feed knife strap 17 and under proper conditions engages the rearmost edge of each card during the feeding operation. Drive disc 16 has a similarly circumferentially mounted feed knife strap 19 which also has a feed knife protuberance 20 for engaging the rearmost edge of each card during a feeding operation. Feed knife strap 17 is shown more fully in FIG. 1, while feed knife strap 19 is shown more fully in FIG. 2. Feed knife straps 17 and 19 are always positioned in about the same relative position with respect to each other and with respect to platen 5 during a feeding operation. Feed knife strap 17 slides in a strap guide 21 in forward and backward directions indicated by arrow 22. Feed knife strap 19 slides forwardly and backwarly in a similar guide at the right end of hopper 1, not shown.

Attached to disc 15 by means of a screw 23 is a relatively long spring 24. Spring 24 is attached at the opposite terminus to a frame member 25. Attached to the drive disc 16 is a spring 26 which is also similarly attached to a frame member 27. As feeding of an individual card proceeds, springs 24 and 26 are expanded. Each spring 24 and 26 subsequently serves to restore the feed knife straps 17 and 19 to their initial home positions with respect to the documents 2, as will be described shortly.

As shown in greater detail in FIG. 2, drive disc 16 is provided with an internally cut cam surface 28 which has a notch 28*a* that is intended to receive the right end of a drive lever 29.

Drive disc 16 also has an aperture 30 that is located in direct proximity to the notch 28*a*. Aperture 30 retains a plunger 31 and associated spring 32. Plunger 31 is normally retained within the aperture 30 by the peripheral retaining action of the feed knife strap 19.

It will be noted that drive lever 29 is mounted for rotation on a shaft 33 which is movably retained in bearing supports 34 and 35 that project from a drive plate 36. Drive plate 36 is fixedly mounted on shaft 10. Drive lever 29 is ordinarily maintained in a substantially horizontal position under control of a leaf spring 37. During the normal feeding condition of the device, the right extension of the drive lever 29 engages notch 28*a* in disc 16. During the early part of a feeding cycle, plunger 31 projects slightly from the surface of disc 16. Drive lever 29 has a pad 38 of a frictional material which under certain circumstances is moved into position on the inner surface 79 of the platen 5 for driving purposes. Ordinarily, platen 5 is freely rotatable, and its movement during feeding and printing is controlled by the leading edge of a card 2 pushing against the positioning blade 14. During the restoration of the device following a printing operation, however, it is necessary that platen 5 be positively driven in order to return positioning blade 14 back to a proper initial position for receiving another card 2 from hopper 1. The positive driving of platen 5 is performed with the assistance of the drive lever 29 and friction pad 38.

Rigidly affixed to the left end of platen 5, is a card pick-off cam 39 which has an associated card pick-off cam follower 40, and an advance cam 41 which has a related cam follower 42. The follower 42 is engaged with cam 41 by means of a cam roller 43 that is mounted on a stud 44. Follower 40 is normally maintained with some tension against cam 39 by means of a spring 45, and follower 42 is similarly maintained with some tension against cam 41 by means of a spring 46. Cam followers 40 and 42 are movably mounted on a shaft 47 which extends substantially parallel with respect to platen 5.

In FIG. 1, it will be seen that a lever 48 is mounted on shaft 47 near the right end of platen 5. Attached at the upper ends of follower 40 and lever 48 is a card gripper 49. Card gripper 49 lies adjacent the platen 5 and normally parallel thereto. A spring 50, together with the previously mentioned spring 45, serves to maintain card gripper 49 with some tension in a direction toward platen 5. Ordinarily, gripper 49 will be kept a slight distance apart from platen 5 by the co-action between cam 39 and follower 40. The slight distance is maintained by the relatively high cut of cam 39. This is true for practically the entire circumference of cam 39, except for a dwell portion 39*a*. During a certain part of the feeding cycle when follower 40 encounters the dwell portion 39*a*, gripper 49 is permitted to move into engagement with a document in order to free it from the positioning blade 14, and enable its subsequent ejectment.

Cam 41 and cam follower 42 are provided for the purpose of restoring the mechanism to its initial condition following the ejectment of each card.

Drive disc 15, like drive disc 16, is freely mounted on drive shaft 10. Associated with drive disc 15 is a drive plate 51 which is practically identical to drive plate 36. Drive plate 51 is fixedly mounted to drive shaft 10, like drive plate 36. Drive plate 51 has a drive lever 52 that is rotatably mounted on a shaft 53. Shaft 53 is retained in bearing supports 54 and 55 that are formed in drive plate 51. Drive lever 52 is normally maintained in a substantially horizontal position by means of a leaf spring 56.

Drive disc 15 has an aperture 57 that is similar to aperture 30 in drive disc 16. Aperture 57 receives a plunger 58 and an associated spring 59. Drive disc 15 also has formed therein an internally cut cam surface 60 which is comparable to the internally cut cam surface 28 in drive disc 16. Cam surface 60 has a notch 60*a* which receives drive lever 52.

The device in FIG. 1 also has a line spacing disc 62, a line spacing ratchet wheel 63, and associated line spacing elements that are shown in FIG. 4 and that will be described in detail hereinafter.

Operation of the apparatus can be observed by reference to FIGS. 3*a*, 3*b*, 3*c*, 3*d*, 3*e*, and 3*f* which, together, represent a complete cycle of operation for feeding one card.

Each of the FIGS. 3*a*–3*f* depicts the relative position and movement of various ones of the elements in FIGS. 1 and 2 as they would be observed looking from the left side toward the right side of the device along the line 3—3 in FIG. 2. As an example, FIG. 3*a* includes the previously mentioned platen 5 with its positioning blade 14, card pick-off cam 39, and its associated follower 40, and advanced cam 41, and its associated follower 42. Portions of cam 39 have been cut away, in some cases, for clarification purposes. The elements just mentioned are concentrically mounted on platen drive shaft 10. Also shown in the FIGS. 3*a*–3*f*, are feed knife strap 19 and its associated feed knife 20. These could equally well represent feed knife strap 17 and feed knife 18, not shown. In addition, drive lever 29, cam surface 28, notch 28*a*, plunger 31, and compression spring 32 are also shown in the sequence of figures. It will be noticed that the plunger 31 projects slightly above the surface of the platen 5 in all figures, except FIG. 3*d*. The surface of platen 5 is coextensive with the surface of the drive disc 16 and therefore can represent either of these elements.

Figures 3A, 3B, 3C:
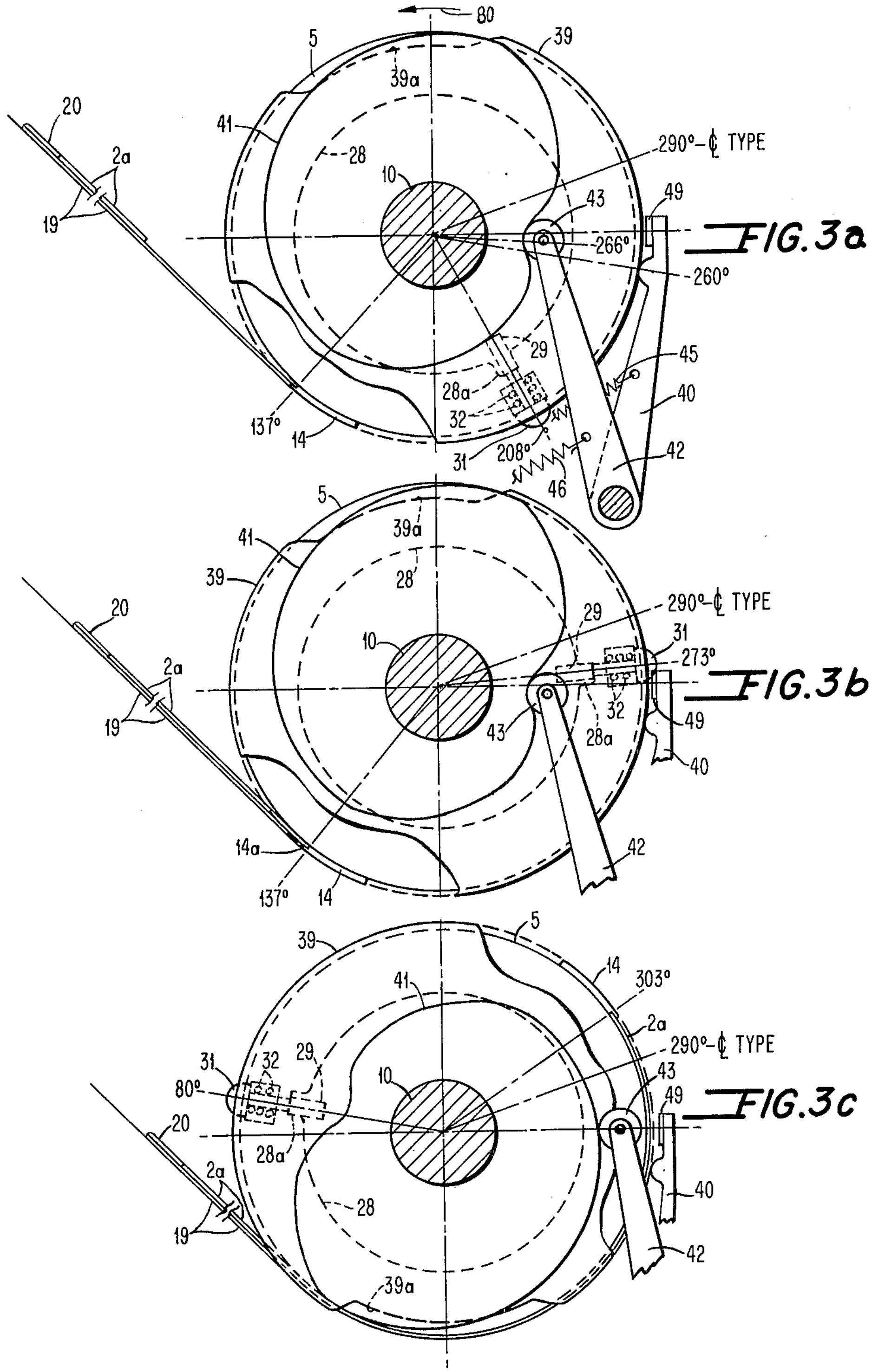
Figures 3D, 3E, 3F:
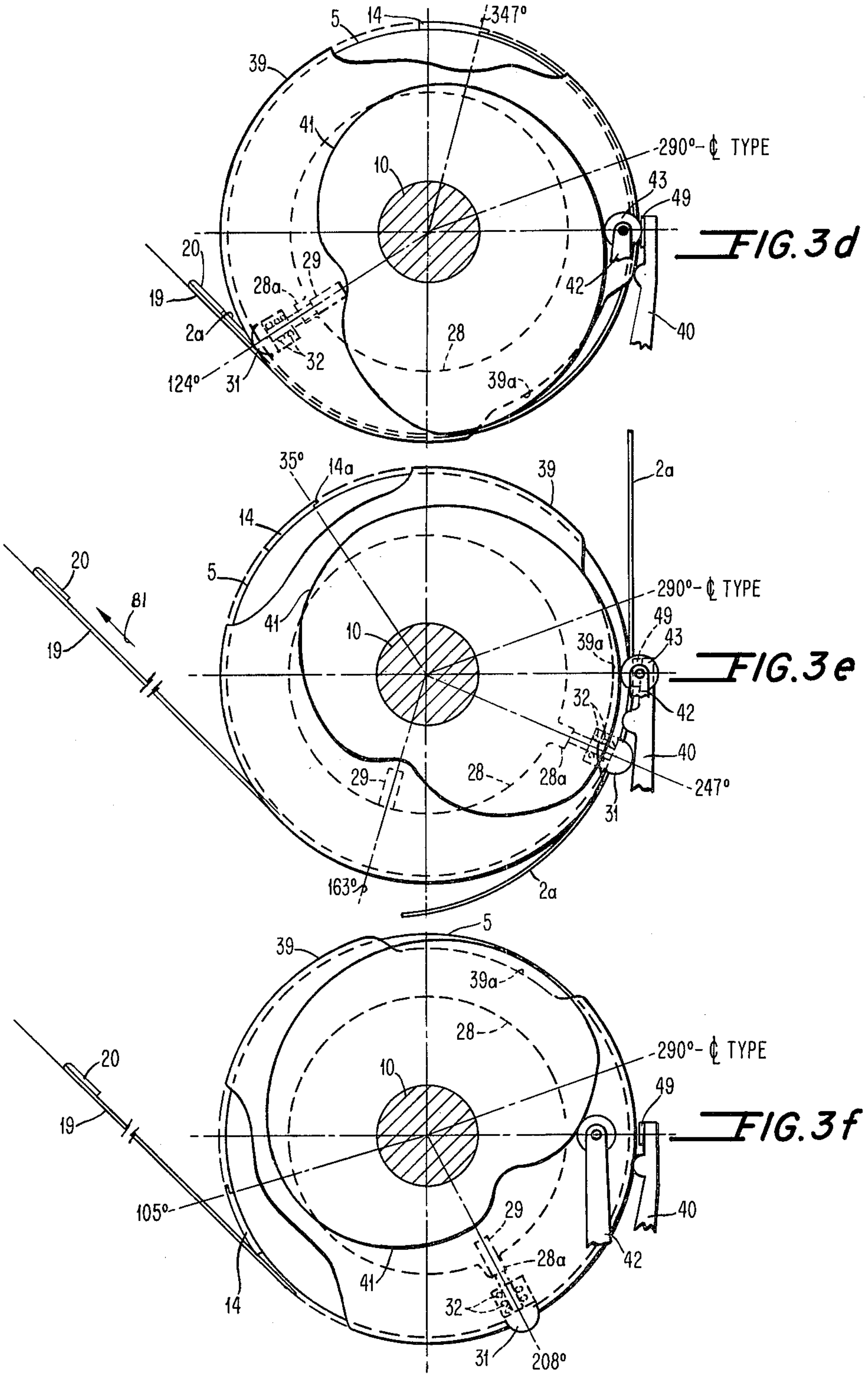

Because of the co-action between follower 40 and card pick-off cam 39 at 260°, FIG. 3*a*, it will be seen that card gripper surface 49 is maintained slightly apart from the surface of the platen 5 in all figures except FIG. 3*e*, which represents the portion of the cycle when the card is gripped for ejectment.

In FIG. 3*a*, it is of interest that initially roller 43 on cam follower 42 rests in the dwell at 266° in cam 41. This represents the restored or home position of the platen and associated mechanism.

In FIG. 3*a*, it will be seen that the drive lever 29 is initially engaged with the notch 28*a* inside drive disc 16. Leaf spring 37, FIG. 2, which is not shown in FIG. 3*a*, maintains pressure on the lever 29 so that plunger 31 is normally in its outermost or projected position. At this time, platen 5 is in a free running condition and the positioning blade 14 which is affixed to platen 5 has its engaging edge at a radial position of 137°.

All angular radial positions of the device shown in FIGS. 3*a*–3*f* are referenced with respect to a 12 o'clock position which is considered to be 0°, and are considered to be located in a counter-clockwise direction with respect to the 12 o'clock position. For example, the edge of positioning blade 14 lies at 137° when the mechanism is in its restored condition. Similarly, plunger 31 is positioned at 208°, and the center line of typing at 290°. Most of the elements involved in the mechanism will change their relative angular positions with respect to the 12 o'clock position during the course of operation of the device. However, the center line of typing will remain at the radial position of 290°. The various radial positions used herein are merely suggested for ease in explaining the operation of the device. They are not critical in any respect, and are not intended to be restrictive.

In FIG. 3*a*, feed knife strap 19 is fully extended under the stack of cards in the hopper 1 and is ready to engage the rear edge of a card for feeding purposes. The drive lever 29 is engaged at substantially 208° with notch 28*a* on the inside of the drive disc 16. Drive lever 52 is in an identical condition with respect to notch 60*a* on the inside of drive disc 15, FIG. 2.

In order to feed a card into position around the platen 5 for printing, the operator manually rotates either one or both of the platen knobs 7 and 8, FIG. 1.

Since the drive plates 36 and 51 are affixed to the shaft 10, and since their respectively associated drive levers 29 and 52 are normally in engagement with the notches 28*a* and 60*a* in the discs 16 and 15, rotation of either or both of the platen knobs 7 and 8 will consequently result in rotation of the discs 15 and 16 in a counter-clockwise direction as indicated by arrow 80, FIG. 3*a*.

As a result of the rotation of the discs 15 and 16, feed knife straps 17 and 19 are drawn forwardly and gradually tend to be wound about the peripheries of the discs 15 and 16.

Since platen 5 is rotatably mounted on drive shaft 10, platen 5 will not be rotated during the initial stages of feeding of the feed knives 17 and 19. This is illustrated by a comparison of FIG. 3*a* with FIG. 3*b*. Both cams 39 and 41 are in the same relative position in FIG. 3*b* as they are in FIG. 3*a*. The platen 5 which carries cams 39 and 41 is also in the same position in FIG. 3*b* as it is in FIG. 3*a*.

It will be seen in FIG. 3*b*, however, that drive disc 16, as represented by its internally cut cam surface 28 and notch 28*a*, has been rotated. Notch 28*a*, cam surface 28, and drive lever 29 have moved in a counter-clockwise direction along with plunger 31 and spring 32 to a radial position of 273°.

The extent of rotation of the drive discs, as represented by notch 28*a* in FIG. 3*b*, is 65°. This results in moving card 2*a* a sufficient distance so that its leading edge contacts blade 14 at 137° in FIG. 3*b*. Card 2*a* moves under a lip 14*a* on blade 14. Platen 5 and its associated positioning blade 14 are maintained snugly against the leading edge of the card by pressure exerted on cam 41 by cam follower 42 under control of spring 46.

Referring now to FIG. 3*c*, it can be seen that continued rotation of the platen knobs has resulted in the drive lever 29, notch 28*a*, plunger 31, and spring 32 being rotated to a radial postion of 80°. By this time, the leading edge of card 2*a* that is engaged with the positioning blade 14, has reached a radial position of 303°. Since the center line of typing is at 290°, the card is now considered to be in position for printing of the first line of information.

As soon as one line of information has been typed, the type head may be moved to the left hand end of the platen for starting another line. Following the printing of each line of information by type head 3, platen 5 may be rotated manually by operation of knobs 8 or 9, FIG. 1, or by driving a line spacing pawl 66, FIG. 4, into engagement with the ratchet wheel 63. The line spacing (indexing) mechanism is similar to the mechanism that is fully described in a copending application Ser. No. 268,681, filed March 28, 1963, inventor George T. Miles entitled "Paper Feeding Mechanisms for Typewriters" and having the same assignee as the present application. A brief description of the mechanism is given below.

Ratchet wheel 63 and its associated line spacing disc 62, FIGS. 1 and 4, are affixed to shaft 10 snugly against one another. Some adjustment is provided with respect to their relative positions by means of a slot 64 and a screw 65 which fits into a threaded aperture in ratchet 63, not shown.

Line spacing pawl 66 is pivotally mounted at 67 to a bellcrank 68. Pawl 66 is relatively wide and is positioned in such a manner with respect to the line spacing disc 62 and ratchet 63 that its width encompasses the peripheries of both disc 62 and ratchet 63. Line spacing disc 62 has a somewhat larger diameter than ratchet wheel 63, and is formed in such a manner that it projects beyond ratchet wheel 63 for the greater portion of its periphery. Disc 62 has a portion 62*a* which is undercut with respect to ratchet wheel 63. This is indicated by exposure of the ratchet wheel teeth at 63*a*.

During the greater part of a card feeding cycle, line spacing pawl 66 is maintained out of engagement with ratchet wheel 63 because it is in engagement with the higher projecting periphery of the line spacing disc 62. A suitable detent roller 78 is maintained in engagement with the teeth of ratchet wheel 63 at all times so that incremental line spacing of the platen drive shaft 10, and drive discs 15 and 16 will occur, as in any normal typewriter spacing operation.

The provision of line spacing disc 62, ratchet wheel 63, and associated elements, as described, permits the manual manipulation of the document feeding device under control of the platen knobs 7 and 8 in order to effect the feeding of a card into printing position when line spacing pawl 66 is disengaged from ratchet 63. Once the card has been positioned to the first line of printing, however, it is desirable that the line spacing function be performed in an automatic fashion under control of the line spacing pawl 66. When the document is in proper position for printing of the first line, the dwell 62*a* on the line spacing disc 62 will be starting past the line spacing pawl 66. Because of this, the line spacing pawl can then drop inwardly toward drive shaft 10 and come into engagement with the teeth of ratchet wheel 63. This permits the line spacing function to be performed automatically during the printing part of the procedure.

Bellcrank 68 is mounted on a fixed pivot 69 at the rear side of the platen 5. A link 70 connects bellcrank 68 to another bellcrank 71 carrying a roller 72 which rides on a single lobed cam 73 that is freely mounted on a continuously rotating shaft 74. The bellcrank 68 is urged by a spring 75 in a direction to maintain a tension on the link 70 so the roller 72 is held in engagement with the cam 73. Pawl 66 is urged by a spring 76 toward the ratchet wheel 63, but a fixed abutment 77 acts to hold the pawl free of the ratchet wheel as long as the roller 72 engages the low portion of the cam 73. When the high part of the cam 73 moves under the roller 72 and pulls the link 70 downwardly, pawl 66 moves free of abutment 77 and is rocked into engagement with ratchet wheel 63 for rotating the latter a limited distance.

For driving cam 73, there is provided a disc 85 freely mounted on the shaft 74 at one side of the cam and having a shoulder 85*a* which is normally engaged by a control pawl 86. Extending through an opening 87 in disc 85 is a stud 88 which is fixed to cam 73 and pivotally supports a drive pawl 89 having a tooth 90 engageable with a ratchet wheel 91 fixed to shaft 74. Another opening 92 in disc 85 has a cam surface which is engaged by a pin 93 extending inwardly from drive pawl 89. This cam surface acts on pin 93 to cam drive pawl 89 away from ratchet wheel 91 when cam 73 is rotated counterclockwise relative to disc 85. The free end of drive pawl 89 is connected by a spring 94 to a stud 95 on cam 73 so it is continuously urged in a direction to engage tooth 90 with ratchet wheel 91.

When control pawl 86 is disengaged from shoulder 85*a*, drive pawl 89 is swung inwardly by spring 94 causing pin 93 to act on the cam surface at the leading edge of the opening 92 and effects a turning of disc 85 in a counterclockwise direction relative to cam 73. As soon as the tooth 90 on drive pawl 89 engages the ratchet wheel, cam 73, as well as disc 85, is driven in a counterclockwise direction. For each rotation of cam 73, pawl 66 is driven to rotate the platen one line space. As soon as control pawl 86 is again engaged with the shoulder 85*a*, disc 85 is held against rotation while cam 73 continues to turn slightly due partly to the driving action of the ratchet wheel and partly to inertia. The relative rotation between the cam and the disc causes pin 93 to ride up the cam surface at the leading edge of the opening 92 and disengage tooth 90 from the ratchet wheel 91. In order to hold cam 73 in a position to maintain the drive pawl disengaged from the ratchet wheel, there is provided a check pawl 96 which is engageable with a shoulder on a plate attached to the rear side of cam 73.

Movement of control pawl 86 into and out of engagement with shoulder 85*a* is effected by a keylever 97. When keylever 97 is depressed, link 98 is operated to the left and causes arm 99 to swing far enough for disengaging control pawl 86 from the shoulder 85*a*. Disc 85 then rotates to a position in which tooth 90 engages ratchet wheel 91 and causes a driving of the cam 73. Each rotation of cam 73 causes a rocking of the bellcrank 71 to drive pawl 66 against ratchet wheel 63 for rotating the platen to advance the document one line space.

Following the conditions shown in FIG. 3*c*, one or more lines of information can be printed on the card 2*a*. As line spacing occurs during the printing of each of the lines on the card 2*a*, platen 5, positioning blade 14, cams 39 and 41, as well as drive disc notch 28*a*, drive lever 29, plunger 31, and spring 32 will continue to move in a counter-clockwise direction.

Until the plunger 31 reaches the radial position of 124° as shown in FIG. 3*d*, printing and line spacing functions can proceed uninterrupted. It is assumed that each line space results in counter-clockwise movement of the card 2*a* a distance that corresponds approximately to 11° counterclockwise rotation.

FIG. 3*d* represents the condition of the apparatus at the end of the printing operation. It will be seen that platen advance cam 41 has moved cam follower 42 and roller 43 quite far to the right as compared to the home position in FIG. 3*a*. This results in loading spring 46 that is associated with follower 42. This loading of spring 46 will subsequently be used to restore the platen 5 to home position, to be described later. At this time, card pick off cam follower 40 and card gripper 49 are still maintained out of engagement with card 2*a* by the high lobe portion of card pick-off cam 39. It will be noted however that the follower 40 is nearing the dwell 39*a* of cam 39 at this time. Drive lever 29, notch 28*a*, plunger 31, and spring 32 have reached a radial position of 124°. At a radial position of approximately 116°, the plunger 31 first comes into contact with feed knife strap 19. Continued rotation of the platen has resulted in the depression of plunger 31 inwardly toward drive shaft 10. The innermost extremity of plunger 31 is in engagement with drive lever 29. Because of the movement of plunger 31 inwardly, drive lever 29 becomes disengaged from notch 28*a* in drive disc 16. The engaging edge of positioning blade 14 is now at 347°.

While the apparatus is being rotated from the home position shown in FIG. 3*a* to the postion shown in FIG. 3*d*, springs 24 and 26 are gradually expanded as their associated drive discs 15 and 16 move counterclockwise. With drive lever 29 now disengaged from notch 28*a*, drive disc 16 can be restored to its initial position in a clockwise direction under control of spring 26, FIG. 1. A similar action takes place concurrently with respect to drive disc 15 when its associated drive lever 52 is disengaged by plunger 58, FIG. 2. Drive disc 15 is thereupon also permitted to restore in a clockwise direction under control of its associated spring 23. The clockwise rotation of discs 15 and 16 results in the restoration of attached feed knife straps 17 and 19 to their respective home positions in readiness for feeding another card. Discs 15 and 16 become disengaged from discs 15 and 16 move clockwise until their drive notches, such as notch 28*a*, are at 208°. Platen 5 can no longer their respective drive levers at about 128°, at which time be driven by pressure of the leading edge of card 2*a* against blade 14. Therefore, a different mode of driving platen 5 exists during the continued movement of drive levers 29 and 52 counterclockwise from 124° to 208°.

Referring to FIG. 2, as soon as drive lever 29 becomes fully disengaged with respect to notch 28*a*, the right extremity of drive lever 29 is then held inwardly by cam surface 28 toward drive shaft 10. Its left extremity then moves outwardly away from drive shaft 10 and friction pad 38 becomes frictionally engaged with the inner surface 79 of platen 5. This couples drive plate 36 to platen 5 so that platen 5 will continue to be driven counterclockwise as knobs 7 and 8 are rotated. Friction pad 38 remains engaged with platen 5 until drive lever 29 once again becomes engaged with notch 28*a* in drive disc 16 at 208°, at which time platen 5 is in a position to be fully restored to home position under control of spring 46, cam 41, and cam follower 42. Subsequently, platen 5 is moved in the following cycle by pressure exerted by another card against blade 14, as previously described.

In FIG. 3*e*, feed knife strap 19 and feed knife 20, as well as strap 17 and feed knife 18, not shown, are assumed to be restoring to their home position as indicated by arrow 81. Drive disc 16 with its notch 28*a*, plunger 31 and spring 32 are arbitrarily shown at about 247°, but are actually in the process of returning to the home position of 208° as shown in FIGS. 3*a* and 3*f*. At this time drive lever 29 will still be moved in a counterclockwise direction if the platen knobs 7 and 9 are rotated. Drive lever 29 is shown at this time at a radial position of 163° during its movement in a counter-clockwise direction. Positioning blade 14 has moved to an angular position of 35°. The card pick-off cam follower 40 has fallen into the low dwell of the card pick-off cam 39, so that the card gripper 49 is now in engagement with card 2*a*.

Card gripper 49 is provided in the device in order to frictionally grip card 2*a* and disengage it from lip 14*a* on positioning blade 14 so that the operator can easily remove the card 2*a* from the device following the printing operation. It will be noted in FIG. 3*e* that the leading edge of card 2*a* has been freed from the positioning blade 14. The trailing edge of card 2*a* has been freed from feed knife 20 as a result of the movement toward home position of feed knife 20.

The final stages of the operation can be observed by reference to FIG. 3*f*. By this time, the feed knife 20 has been completely restored to its proper position under the stack of cards 2 in FIG. 1 so that it is in condition for engaging the rear edge of the next card to be fed through the device. The same applies to the feed knife 18 which is also in position for engagement with the rear edge of the next card to be fed. As a result of the restoration action just completed, notch 28*a* and plunger 31 in drive disc 16 have returned to the original home position of 208°. Continued rotation of the platen knobs 7 and 8 has resulted in the counter-clockwise movement of the drive lever 29 which upon reaching a position of approximately 208° is returned into engagement with notch 28 under control of the leaf spring 37, FIG. 2. As a result of the drive lever 29 again becoming engaged with notch 28*a*, the friction pad 38, on lever 29, FIG. 2, becomes disengaged from the inner surface 79 of platen 5. It will be recalled that during the entire period that lever 29 is disengaged from notch 28*a*, the friction pad 28 is frictionally engaged with the platen 5 in order to drive it in a counterclockwise direction.

By the time the apparatus reaches the condition shown in FIG. 3*f*, the advance cam 41 will have moved to such a position that the roller 43 on cam follower 42 rests at the beginning of the dwell on cam 41. All this time, the engaging edge of positioning blade 14 is at 105°. As soon as the drive lever 29 moves into the notch 28*a* and becomes disengaged from platen 5, the pressure exerted by spring 46 tends to force the roller 43 down the slope on the cam 41 toward home position, thereby effectively continuing the rotation of the platen 5 and positioning blade 14 to their normal home positions. When the apparatus reaches the condition shown in FIG. 3*f*, the card pick-off cam follower 40 is again on the high lobe of the card pick-off cam 39 so that the card gripper 49 will have been moved away from the surface of the platen 5.

Following the return of the platen 5 and positioning blade 14 to their initial positions, the apparatus is in a completely restored condition, and is ready for the feeding of the next document. This will be initiated again under operator control with continued rotation of the platen knobs 7 and 8.

It is apparent that a novel document feeding device has been developed which insures accurate feeding, aligning and ejecting of individual documents. When used in conjunction with a typewriting apparatus, the device insures accurate placement of individual documents in order that printing of information in one or more lines theron will also take place with high accuracy. In addition, the functions of the device are carried out with very few procedures required on the part of the operator in addition to those normally encountered during use of the typewriting apparatus. The feeding, printing, and restoration functions of the device are performed first manually, then automatically, as required, during continued rotation of the platen mechanism of the typewriter in a single direction only.

While the invention has been particularly shown and described with reference to a preferred embodiment thereof, it will be understood by those skilled in the art that various changes in form and detail may be made without departing from the spirit and scope of the invention.

What is claimed is:

1. Apparatus for successively feeding each of a plurality of documents into position for printing in an office machine comprising:

a drive shaft;

a cylindrical member, said member being normally freely and rotatably mounted on said drive shaft, and positioned adjacent said documents, and said member having an element positioned thereon for receiving and retaining the leading edge of each document fed;

a drive disc, said drive disc being freely mounted on said drive shaft adjacent said member;

a feed knife strap associated with said drive disc, said strap having an end thereof peripherally attached to said disc and initially extending from said disc to engage an individual document;

a drive plate, said drive plate being fixedly mounted on said drive shaft intermediate said member and said drive disc;

a drive element, said element being mounted on said drive plate for engagement with said drive disc during a portion of a feeding cycle and for engagement with said cylindrical member during another portion of a feeding cycle;

means for rotating said drive shaft, to thereby rotate said drive disc, and its associated feed knife strap in order to feed a document into engagement with said retaining element and to thereafter rotate said document around to a printing position;

means operative during a cycle for disengaging said drive element from said drive disc and for engaging the same with said cylindrical member;

means for restoring said drive disc and its associated feed knife strap to their initial positions in preparation for feeding another document;

means responsive to continued rotation of said drive shaft for disengaging said drive element from said cylindrical member and for again engaging the same with said drive disc;

and means operative following disengagement of said drive element from said cylindrical member for restoring said member in preparation for a subsequent cycle.

2. The apparatus of claim 1 which further comprises:

means operative prior to the restoration of said drive disc and its associated feed knife strap to their initial positions for removing the leading edge of said document from said retaining element in order to eject said document from said apparatus during the final portion of said cycle.

3. Apparatus for successively feeding each of a plurality of documents into position for printing in a typewriter, comprising:

a hopper for said documents;

a platen drive shaft;

a cylindrical platen member, said platen member being normally freely and rotatably mounted on said drive shaft, and positioned adjacent said hopper, and said platen having a retaining element positioned thereon for receiving and retaining the leading edge of each document fed;

a drive disc, said drive disc being freely mounted on said drive shaft adjacent said platen;

a feed knife strap associated with said drive disc, said strap having an end thereof peripherally attached to said disc and initially extending from said disc to engage an individual document;

a drive plate, said drive plate being fixedly mounted on said drive shaft intermediate said platen and said drive disc;

a drive element, said element being mounted on said drive plate for engagement with said drive disc during a portion of a feeding cycle and for engagement with said platen during another portion of a feeding cycle;

means for rotating said drive shaft to thereby rotate said drive disc and its associated feed knife strap in order to feed a document into engagement with said platen retaining element, and to thereafter rotate said platen and said document around to a printing position;

means operative during a cycle for disengaging said drive element from said drive disc and for engaging the same with said platen;

means for restoring said drive disc and said associated feed knife strap to their initial positions in preparation for feeding another document;

means responsive to continued rotation of said drive shaft for disengaging said drive element from said platen and for again engaging the same with said drive disc;

and means operative following disengagement of said drive element from said platen for restoring said platen in preparation for a subsequent cycle.

4. Apparatus for successively feeding each of a plurality of documents into position for printing in a typewriter, comprising:

a hopper for said documents;

a platen drive shaft;

a cylindrical platen member, said platen member being normally freely and rotatably mounted on said drive shaft, and positioned adjacent said hopper, and said platen member having a retaining element positioned thereon for receiving and retaining the leading edge of each document fed;

a pair of drive discs, said drive discs being freely mounted on said drive shaft adjacent opposite ends of said platen;

a pair of feed knife straps each being respectively associated with an individual one of said drive discs, each said strap having an end thereof peripherally attached to its associated disc and extending from said disc to engage an individual document;

a pair of drive plates, each said drive plate being associated with a respective one of said drive discs and being fixedly mounted on said drive shaft intermediate a respective end of said platen and said associated drive disc;

a pair of drive elements, each said element being mounted on a respective drive plate for engagement with said drive disc during a portion of a feeding cycle and one of said drive elements being mounted for engagement with said platen during another portion of a feeding cycle;

means for rotating said drive shaft to thereby rotate each of said drive discs and its associated feed knife strap in order to feed a document into engagement with said platen retaining element and to thereafter rotate said platen and said document around to a printing position;

means operative during a cycle for disengaging each of said drive elements from its associated drive disc and for engaging said one drive element with said platen;

means for restoring said drive discs and their associated feed knife straps to their initial positions in preparation for feeding another document;

means responsive to continued rotation of said drive shaft for disengaging said one drive element from said platen and again engaging the same with its associated disc;

and means operative following disengagement of said one drive element from said platen for restoring said platen in preparation for a subsequent cycle.

5. Apparatus operable during individual cycles from a home position to feed documents into position for performing a desired operation, comprising:

document supply means;

document supporting means for receiving an individual document and retaining the same during said operation;

feeding means positioned to feed a document from said supply means to said supporting means;

drive means positioned for selective driving engagement with said feeding means or said supporting means;

restoring means for restoring said supporting means and said feeding means to their respective home positions;

and control means operable during each cycle (1) to maintain said drive means in engagement to drive said feeding means to thereby feed a document to said supporting means for performance of said operation, (2) to thereupon disengage said drive means from said feeding means so that said feeding means is restored home by said restoring means and to concurrently move said drive means into engagement to drive said supporting means, and (3) subsequently, in the cycle to disengage said drive means from said supporting means so that said supporting means is restored home by said restoring means and to again engage said drive means with said feeding means in preparation for a subsequent cycle.

6. Apparatus operable during individual cycles from a home position to feed documents into position for performing a desired operation, comprising:

document supply means;

a drive shaft;

document supporting means concentrically and freely mounted on said shaft, said supporting means having a retaining member;

first drive means freely mounted on said shaft, said first drive means when in home position having a feed element extending into said supply means for engagement with one of said documents;

second drive means fixedly mounted on said shaft, said second drive means being positioned for selective driving engagement with said first drive means or said supporting means;

restoring means operable to restore said first drive means and said supporting means to home position;

and control means operable during each cycle to maintain said second drive means in engagement with said first drive means so that when said drive shaft is rotated from home position a document is fed from said supply means, engages said retaining means and is rotated around to an operating position, said control means being further operable during each cycle to disengage said second drive means from said first drive means as rotation of said shaft continues so that said first drive means is restored to home position by said restoring means and to concurrently move said second drive means into engagement to drive said supporting means, and said control means being further operable during each cycle to disengage said second drive means from said supporting means so that said supporting means is restored home by said restoring means, and to again engage said second drive means with said first drive means in preparation for a subsequent cycle.

7. Apparatus operable during individual cycles from a home position to feed documents into position for performing a desired operation, comprising:

document supply means;

a drive shaft;

means for rotating said drive shaft;

a document supporting member concentrically and freely mounted on said shaft, said supporting member having a retaining member;

first drive means concentrically and freely mounted on said shaft, said first drive means when in home position having a feed element extending into said supply means for engagement with one of said documents;

second drive means fixedly mounted on said shaft intermediate said supporting member and said first drive means, said second drive means having a drive element extending for selective engagement with said first drive means or said supporting member;

first restore means operable to restore said first drive means to home position;

first cam means operable during each cycle to maintain said drive element in engagement with said first drive means so that when said drive shaft is rotated from home position a document is fed from said supply means, engages said retaining means and is rotated around to an operating position, said first cam means being further operable during each cycle to disengage said drive element from said first drive means as rotation of said shaft continues so that said first drive means is restored home by said first restore means and to move said drive element into engagement to drive said supporting member, and said first cam means being further operable during each cycle to disengage said drive element from said supporting member and to again engage said drive element with said first drive means in preparation for a subsequent cycle;

and second restore means operable upon disengagement of said drive element from said supporting member to restore said supporting member to home position.

8. Apparatus operable during individual cycles from a home position to feed documents into position for performing a desired operation, comprising:

document supply means, said supply means having guide means for guiding a succession of documents in a predetermined path;

a drive shaft;

means for rotating said shaft;

a document supporting member concentrically and freely mounted on said shaft, said supporting member having a retaining member position when said supporting member is in a home position to receive a document guided from said hopper;

first drive means concentrically and freely mounted on said shaft adjacent an end of said supporting member, said first drive means when in home position having a feed knife strap extending into said supply means for engagement with one of said documents;

second drive means fixedly mounted on said shaft intermediate said supporting member and said first drive means, said second drive means having a pivotally mounted drive element extending in one direction for driving engagement with said first drive means when in home position and in a second direction for selective driving engagement with said supporting member when required during each cycle of operation;

first restore means operable to restore said first drive means to home position;

cam means operable during each cycle to maintain said drive element in engagement with said first drive means so that when said drive shaft is rotated from home position a document is fed from said supply means, engages said retaining means and is rotated around to an operating position, said cam means being further operable to disengage said drive element from said first drive means as rotation of said shaft continues so that said first drive means is restored home by said first restore means and so that the opposite extension of said drive element becomes engaged for driving said supporting member, and said cam means being further operable to disengage said drive element from said supporting member and to again engage said drive element with said first drive means in preparation for a subsequent cycle;

and second restore means operable upon disengagement of said drive element from said supporting member to restore said supporting member to home position.

9. Apparatus operable during individual cycles from a home position to feed documents into position for performing a desired operation, comprising:

a document hopper, said hopper having guide means for guiding a succession of documents in a predetermined path;

a drive shaft arranged in parallel relation with respect to the leading edge of any document guided from said hopper;

a cylindrical member concentrically and freely mounted on said shaft, said cylindrical member having a retaining member positioned when said cylindrical member is in a home position to receive a document guided from said hopper;

a drive disc concentrically and freely mounted on said shaft adjacent an end of said cylindrical member, said drive disc when in home position having a feed knife strap extending into said hopper for engagement with one of said documents;

a drive plate fixedly mounted on said shaft intermediate said cylindrical member and said drive disc, said drive plate having a pivotally mounted drive lever extending in one direction for driving engagement with said drive disc when in home position and in a second direction for selective driving engagement with said cylindrical member when required during each cycle of operation;

spring means operable to restore said drive disc to home position;

first cam means operable during each cycle to maintain said drive lever in engagement with said drive disc so that when said drive shaft is rotated from home position a document is fed in said predetermined path from said hopper, engages said retaining means and is rotated around to an operating position, said first cam means being further operable during each cycle to disengage said drive lever from said drive disc as rotation of said shaft continues so that said drive disc is restored home by said spring means and so that the opposite extension of said drive lever becomes drivingly engaged with said cylindrical member, and said first cam means being further operable during each cycle to disengage said drive lever from said cylindrical member and to again engage said drive lever with said drive disc in preparation for a subsequent cycle;

and second cam means operable upon disengagement of said drive lever from said cylindrical member during each cycle to restore said cylindrical member to home position.

10. Apparatus operable during individual cycles from a home position to feed documents into position for performing a printing operation, comprising:

a document hopper, said hopper having guide means for guiding a succession of documents in a predetermined path;

a platen drive shaft arranged in parallel relation with respect to the leading edge of any document guided from said hopper;

a pair of platen knobs, one at each end of said shaft for manual rotation of said shaft;

a cylindrical platen member concentrically and freely mounted on said shaft, said platen member having a retaining member positioned when said platen member is in a home position to receive a document guided from said hopper;

a drive disc concentrically and freely mounted on said shaft adjacent an end of said platen member, said drive disc when in home position having a feed knife strap extending into said hopper for engagement with one of said documents;

a drive plate fixedly mounted on said shaft intermediate said platen member and said drive disc, said drive plate having a pivotally mounted drive lever extending in one direction for driving engagement with said drive disc when in home position and in a second direction for driving engagement with said platen member when required during each cycle of operation;

spring means operable to restore said drive disc to home position;

first cam means operable during each cycle to maintain said drive lever in engagement with said drive disc so that when said drive shaft is rotated from home position a document is fed from said hopper, engages said retaining means and is rotated around to a printing position, said first cam means being further operable during each cycle to disengage said drive lever from said drive disc as rotation of said shaft continues so that said drive disc is restored home by said spring means and so that the opposite extension of said drive lever becomes drivingly engaged with said platen member, and said first cam means being further operable during each cycle to disengage said drive lever from said platen member and to again engage said drive lever with said drive disc in preparation for a subsequent cycle;

and second cam means operable upon disengagement of said drive lever from said platen member during each cycle to restore said platen member to home position.

11. The apparatus of claim 10 which further comprises:

means operable to index said document a predetermined plurality of line spaces during said printing operation in order to print information on a corresponding plurality of lines on said document.

12. The apparatus of claim 10 which further comprises:

a second drive disc concentrically and freely mounted on said shaft adjacent an opposite end of said platen member, said second drive disc when in home position having a feedknife strap extending into said hopper for engagement with one of said documents;

a second drive plate fixedly mounted on said shaft intermediate said platen member and said second drive disc, said second drive plate having a pivotally mounted drive lever extending for driving engagement with said second drive disc when in home position;

second spring means operable to restore said second drive disc to home position;

and additional cam means operable concurrently with said first cam means during each cycle to maintain said second drive lever in engagement with said second drive disc while said drive lever is engaged with said drive disc, and said additional cam means being further operable to disengage said second drive lever from said second drive disc for restoration to home position concurrently with disengagement of said drive lever from said drive disc during each cycle of operation.

References Cited by the Examiner

UNITED STATES PATENTS

| | | | |
|---|---|---|---|
| 563,627 | 7/1896 | Stevens | 197—130 X |
| 579,940 | 3/1897 | Fredrick | 197—137 |
| 940,336 | 11/1909 | Lewis | 197—131 X |
| 1,121,638 | 12/1914 | Kurowski | 197—137 |
| 1,300,904 | 4/1919 | Wherry | 197—127 |
| 1,795,453 | 3/1931 | Smith | 197—130 |
| 3,000,487 | 9/1961 | Friedrichsen | 197—135 X |

FOREIGN PATENTS

| | | |
|---|---|---|
| 749,936 | 6/1956 | Great Britain. |

ROBERT E. PULFREY, *Primary Examiner.*

ERNEST T. WRIGHT, *Examiner.*